(12) United States Patent
Hair et al.

(10) Patent No.: US 11,718,184 B2
(45) Date of Patent: Aug. 8, 2023

(54) RESOLVER OFFSET DETECTION

(71) Applicant: FORD GLOBAL TECHNOLOGIES, LLC, Dearborn, MI (US)

(72) Inventors: Jonathan Hair, Royal Oak, MI (US); Jonathan Andrew Butcher, Farmington, MI (US); Mohammad Sameer Khan, Windsor (CA); Brendan F. Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/514,213

(22) Filed: Oct. 29, 2021

(65) Prior Publication Data
US 2023/0137049 A1 May 4, 2023

(51) Int. Cl.
*G05B 19/31* (2006.01)
*B60L 15/20* (2006.01)
*H02K 24/00* (2006.01)
*G05B 19/35* (2006.01)

(52) U.S. Cl.
CPC ............ *B60L 15/20* (2013.01); *G05B 19/351* (2013.01); *H02K 24/00* (2013.01); *B60L 2240/421* (2013.01); *B60L 2240/423* (2013.01); *G05B 2219/42074* (2013.01)

(58) Field of Classification Search
CPC ......... H02P 6/16; H02P 21/06; G05B 19/351; G05B 19/404; B60L 15/20; B60L 2240/421; B60L 2240/423; H02K 24/00
See application file for complete search history.

(56) References Cited

U.S. PATENT DOCUMENTS

| | | | |
|---|---|---|---|
| 7,659,688 B2 | 2/2010 | Schulz et al. | |
| 9,007,010 B2 | 4/2015 | Kwon et al. | |
| 10,148,209 B2 | 12/2018 | Treharne et al. | |
| 2019/0157957 A1* | 5/2019 | Rho | G01D 18/00 |

* cited by examiner

*Primary Examiner* — Karen Masih
(74) *Attorney, Agent, or Firm* — David B Kelley; Brooks Kushman P.C.

(57) ABSTRACT

A vehicle includes an electric machine having a rotor and a stator, a resolver that measures a position of the rotor relative to the stator, and a controller. The controller, based on the position and a resolver offset, injects a first current having only a d-axis component into the electric machine, and responsive to detecting a first motion output of the electric machine being greater than a threshold, adjusts the resolver offset according to a magnitude and direction of the first motion output.

18 Claims, 5 Drawing Sheets

RESOLVER OFFSET DETECTION

TECHNICAL FIELD

The present disclosure relates to detecting and correcting a resolver offset in an electric motor.

BACKGROUND

Electric vehicles are propelled by a DC high-voltage (HV) battery supplying power to an AC electric motor. An inverter is used to convert the DC power into AC power. A DC bus capacitor connected between positive and negative HV buses may be discharged by applying current on a d-axis of the motor after the vehicle is parked. A resolver offset is characterized once the electric machine is assembled and this offset is used to adjust a rotor position reading in a motor controller such that a current angle can be properly aligned to a desired rotor position, relative to a magnetic circuit. The resolver offset may have some amount of error due to resolver design, measurement method, or current control accuracy. If a resolver offset error occurs, a q-axis current may be produced which in turn produces torque.

SUMMARY

A vehicle includes an electric machine having a rotor and a stator, a resolver that measures a position of the rotor relative to the stator, and a controller. The controller, based on the position and a resolver offset, injects a first current having only a d-axis component into the electric machine, and responsive to detecting a first motion output of the electric machine being greater than a threshold, adjusts the resolver offset according to a magnitude and direction of the first motion output.

A method for controlling an electric machine of a vehicle includes while the vehicle is parked, repeatedly injecting current into the electric machine having only a d-axis component until motion output of a rotor of the electric machine corresponding to the current is less than a threshold.

A device, for measuring a resolver offset of a resolver of an electric machine of a vehicle, includes a controller that, responsive to a resolver offset testing condition being met, commands that a first current having only a d-axis component be injected into the electric machine, and responsive to detecting a first motion output of the electric machine being greater than a threshold, adjusts the resolver offset according to a magnitude and direction of the first motion output.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
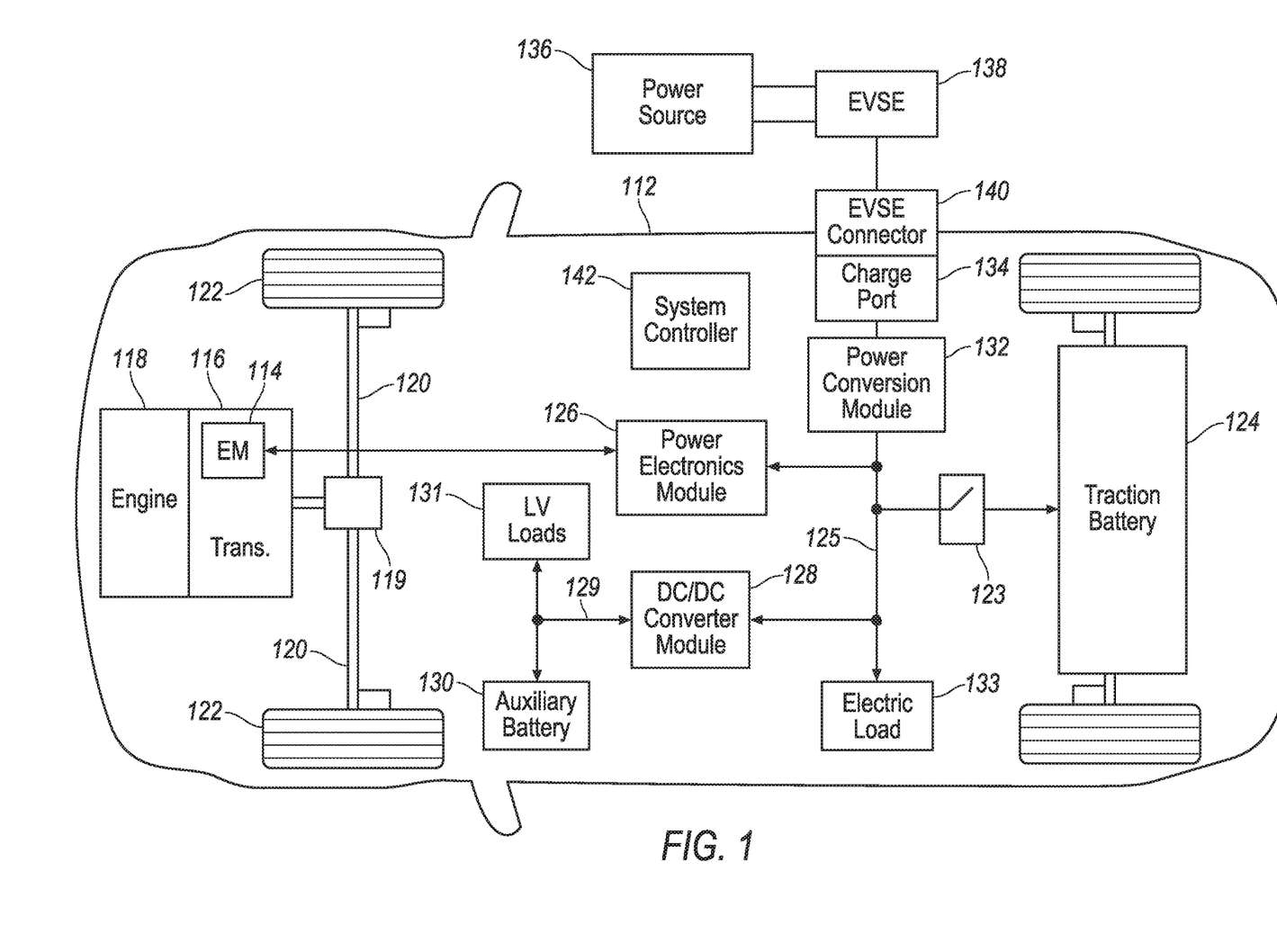
FIG. 1 depicts a possible configuration for an electrified vehicle.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 may be mechanically coupled to a differential 119 that is configured to adjust the speed of drive shafts 120 that are mechanically coupled to drive wheels 122 of the vehicle 112. The drive shafts 120 may be referred to as the drive axle. In some configurations, a clutch may be disposed between the hybrid transmission 116 and the differential 119. The electric machines 114 can provide propulsion and slowing capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A battery pack or traction battery 124 stores energy that can be used by the electric machines 114. The traction battery 124 may provide a high voltage direct current (DC) output. A contactor module 123 may include one or more contactors configured to isolate the traction battery 124 from a high-voltage bus 125 when opened and connect the traction battery 124 to the high-voltage bus 125 when closed. The high-voltage bus 125 may include power and return conductors for carrying current over the high-voltage bus 125. The contactor module 123 may be located in the traction battery 124. One or more power electronics modules 126 may be electrically coupled to the high-voltage bus 125. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage bus 125 to a low-voltage DC level of a low-voltage bus 129 that is compatible with low-voltage loads 131. An output of the DC/DC converter module 128 may be electrically coupled to an auxiliary battery 130 (e.g., 12V battery) for charging the auxiliary battery 130. The low-voltage loads 131 may be electrically coupled to the auxiliary battery 130 via the low-voltage bus 129. One or more high-voltage electrical loads 133 may be coupled to the high-voltage bus 125. The high-voltage electrical loads 133 may have an associated controller that operates and controls the high-voltage electrical loads 133 when appropriate. Examples of high-voltage electrical loads 133 may be a fan, an electric heating element, and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger 132. The charger 132 may condition the power supplied from the EVSE 138 to provide the proper voltage and current levels to the traction battery 124 and the high-voltage bus 125. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by the Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 142 may be present to coordinate the operation of the various components. Note that operations and procedures that are described herein may be implemented in one or more controllers. Implementation of features that may be described as being implemented by a particular controller is not necessarily limited to implementation by that particular controller. Functions may be distributed among multiple controllers communicating via the vehicle network.

The electric machines 114 may be a permanent magnet synchronous motor (PMSM) type machine. A PMSM electric machine includes a rotor and a stator. The stator may include windings for producing a magnetic field to rotate the rotor. Current through the stator windings may be controlled to vary the magnetic field acting on the rotor. The rotor of a PMSM includes permanent magnets that create a magnetic field that interacts with the stator magnetic field to cause rotation of the rotor. The rotor speed may be controlled by the frequency of the magnetic field created by the stator.

The electric machines 114 may be comprised of a stator that includes stator windings and a rotor. The rotor may rotate about a central axis relative to the stator. The electric machines 114 may be controlled by flowing a generally sinusoidal current through stator windings. The amplitude and frequency of the current may be varied to control the torque and speed of the rotor. The stator current creates an electromagnetic field that interacts with the permanent magnets that are part of the rotor. This electromagnetic field causes the rotor to rotate. The electric machines 114 may be configured as three-phase machines. That is, the stator windings may include three separate phase windings. To control the electric machines 114, a three-phase voltage or current waveform is applied to the phase windings. The three-phase waveform is such that each phase signal is separated by a phase difference of 120 degrees.

Figure 2:
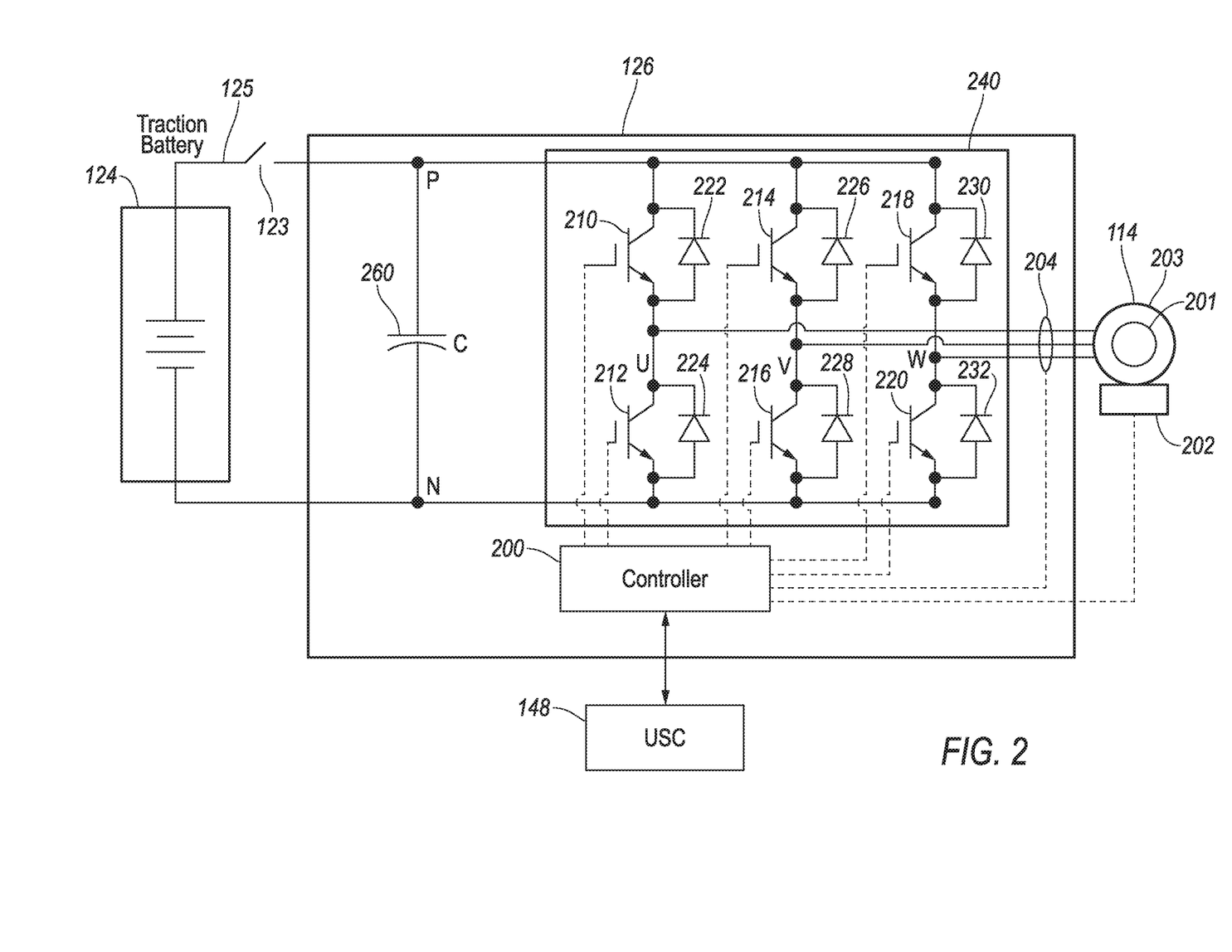
FIG. 2 depicts a possible configuration for a vehicle system including power electronics associated with an electric machine.

The electric machines 114 may be coupled to the power electronics module 126 via one or more conductors that are associated with each of the phase windings. FIG. 2 depicts a block diagram of a vehicle system that includes a motor control system. The vehicle 112 may include one or more power electronics controllers 200 configured to monitor and control the power electronics module 126. The conductors may be part of a wiring harness between the electric machine 114 and the power electronics module 126. A three-phase electric machine 114 may have three conductors coupled to the power electronics module 126. The electric machine 114 includes a rotor 201 and a stator 203. The power electronics module 126 may be configured to switch positive and negative terminals of the high-voltage bus 125 to phase terminals of the electric machines 114.

The power electronics module 126 may be controlled to provide sinusoidal voltage and current signals to the electric machine 114. The frequency of the signals may be proportional to the rotational speed of the electric machine 114.

The controller 200 may be configured to adjust the voltage and current output of the power electronics module 126 at a predetermined switching frequency. The switching frequency may be the rate at which the states of switching devices within the power electronics module 126 are changed. The frequency of the injection voltage may be selected as a predetermined multiple of the switching frequency.

The power electronics module 126 may interface with a position/speed feedback device 202 that is coupled to the rotor of the electric machine 114. For example, the position/speed feedback device 202 may be a resolver or an encoder. The position/speed feedback device 202 may provide signals indicative of a position and/or speed of the rotor of the electric machine 114. The power electronics 126 may include the power electronics controller 200 that interfaces to the speed feedback device 202 and processes signals from the speed feedback device 202. The power electronics controller 200 may be programmed to utilize the speed and position feedback to control operation of the electric machine 114.

The power electronics 126 may include power switching circuitry 240 that includes a plurality of switching devices 210, 212, 214, 216, 218, 220. The switching devices may be Insulated Gate Bipolar Junction Transistors (IGBTs) or other solid-state switching devices. The switching devices may be configured to selectively couple a positive terminal and a negative terminal of the high-voltage bus 125 to each phase terminal or leg (e.g., labeled U, V, W) of the electric machine 114. Each of the switching devices within the power switching circuitry 240 may have an associated diode 222, 224, 226, 228 230, 232 connected in parallel to provide a path for inductive current when the switching device is in a non-conducting state. Each of the switching devices 210, 212, 214, 216, 218, 220 may have a control terminal for controlling operation of the associated switching device. The control terminals may be electrically coupled to the power electronics controller 200. The power electronics controller 200 may include associated circuitry to drive and monitor the control terminals. For example, the control terminals may be coupled to the gate input of the solid-state switching devices.

A first switching device 210 may selectively couple the HV-bus positive terminal to a first phase terminal (e.g., U) of the electric machine 114. A first diode 222 may be coupled in parallel to the first switching device 210. A second switching device 212 may selectively couple the HV-bus negative terminal to the first phase terminal (e.g., U) of the electric machine 114. A second diode 224 may be coupled in parallel to the second switching device 212. A third switching device 214 may selectively couple the HV-bus positive terminal to a second phase terminal (e.g., V) of the electric machine 114. A third diode 226 may be coupled in parallel to the third switching device 214. A fourth switching device 216 may selectively couple the HV-bus negative terminal to the second phase terminal (e.g., V) of the electric machine 114. A fourth diode 228 may be coupled in parallel to the fourth switching device 216. A fifth switching device 218 may selectively couple the HV-bus positive terminal to a third phase terminal (e.g., W) of the electric machine 114. A fifth diode 230 may be coupled in parallel to the fifth switching device 218. A sixth switching device 220 may selectively couple the HV-bus negative terminal to the third phase terminal (e.g., W) of the electric machine 114. A sixth diode 232 may be coupled in parallel to the sixth switching device 220.

The power electronics controller 200 may be programmed to operate the switching devices 210, 212, 214, 216, 218, 220 to control the voltage and current applied to the phase windings of the electric machine 114. The power electronics controller 200 may operate the switching devices 210, 212, 214, 216, 218, 220 so that each phase terminal is coupled to only one of the HV-bus positive terminal or the HV-bus negative terminal at a particular time.

Various motor control algorithms and strategies are available to be implemented in the power electronics controller 200. The power electronics module 126 may also include current sensors 204. The current sensors 204 may be inductive or Hall-effect devices configured to generate a signal indicative of the current passing through the associated circuit. In some configurations, two current sensors 204 may be utilized and the third phase current may be calculated from the two measured currents. The controller 200 may sample the current sensors 204 at a predetermined sampling rate. Measurement values for the phase currents of the electric machine 114 may be stored in controller memory for later computations.

The power electronics module 126 may include one or more voltage sensors. The voltage sensors may be configured to measure an input voltage to the power electronics module 126 and/or one or more of the output voltages of the power electronics module 126. The voltage sensors may be resistive networks and include isolation elements to separate high-voltage levels from the low-voltage system. In addition, the power electronics module 126 may include associated circuitry for scaling and filtering the signals from the current sensors 204 and the voltage sensors.

Under normal operating conditions, the power electronics controller 200 controls operation of the electric machine 114. For example, in response to torque and/or speed setpoints, the power electronics controller 200 may operate the switching devices 210, 212, 214, 216, 218, 220 to control the torque and speed of the electric machine 114 to achieve the setpoints. The torque and/or speed setpoints may be processed to generate a desired switching pattern for the switching devices 210, 212, 214, 216, 218, 220. The control terminals of the switching devices 210, 212, 214, 216, 218, 220 may be driven with Pulse Width Modulated (PWM) signals to control the torque and speed of the electric machine 114. The power electronics controller 200 may implement various well-known control strategies to control the electric machine 114 using the switching devices such as vector control and/or six-step control. During normal operating conditions, the switching devices 210, 212, 214, 216, 218, 220 are actively controlled to achieve a desired current through each phase of the electric machine 114.

The power electronics module 126 may further include one or more capacitors connected across the high-voltage bus 125. For instance, a DC bus capacitor 260 (DC link capacitor) may be connected across the high-voltage bus 125 to maintain the voltage drop between the positive and negative terminals of the high-voltage bus 125. The DC bus capacitor 260 may be further configured to filter ripple currents generated at battery 124 and stabilize the voltage across the high-voltage bus 125. Although the DC bus capacitor 260 is illustrated as a single capacitor in FIG. 2, it is noted that the present disclosure is not limited thereto and the DC bus capacitor 260 may include a plurality of capacitors under various configurations. When the power electronics module 126 is in operation, the DC bus capacitor 260 is charged such that the voltage across the positive and negative terminals of the high-voltage bus 125 may be maintained. When the vehicle is parked and switched off, the DC bus capacitor 260 may be discharged to discharge the high-voltage bus 125. The power electronics controller 200 may apply a discharge current only having a d-axis component to create loss in electric machine windings which in turn discharges energy stored in the DC bus capacitor 260 when the vehicle is parked. The discharge current is preferably applied only to the d-axis of the electric machine 114 without any q-axis component such that the DC bus capacitor 260 may be discharged without causing any rotor torque or rotation of the electric machine 114.

A resolver offset is characterized once the electric machine is assembled and this resolver offset is used to adjust the rotor position reading in the power electronics controller 200 so that current angle can be properly aligned to the desired rotor position, relative to a magnetic circuit. In other words, the power electronics controller 200 needs an accurate resolver offset value to precisely apply the discharge current to the d-axis only without incurring any q-axis component. However, there may be a certain amount of error in the resolver offset in each electric machine affecting the position reading of the rotor position by the power electronics controller 200. In case that a resolver offset error occurs, a q-axis current may be produced which in turn produces torque on the electric machine 114. Torque or motion is undesirable when the vehicle is parked. The present disclosure proposes systems and methods for measuring and correcting the resolver offset error.

Figure 3:
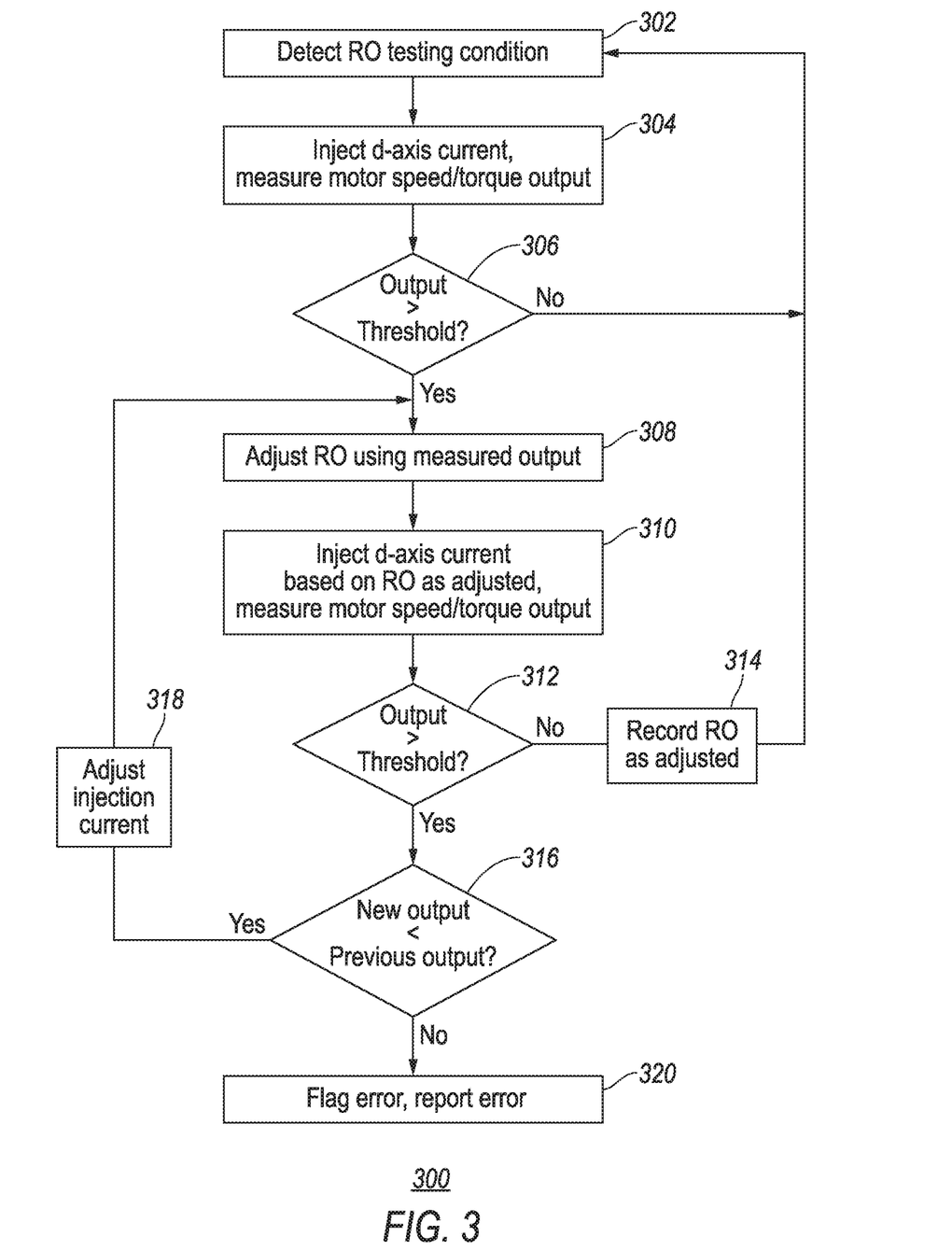
FIG. 3 depicts a flow diagram for a resolver offset measuring and correcting process.

Referring to FIG. 3, an example flow diagram for a process 300 for measuring and correcting resolver offset is illustrated. With continuing reference to FIGS. 1 to 2, the process 300 may be implemented via the vehicle 112 by the power electronics controller 200 in one example. In an alternative example, the process 300 may be implemented via a standalone device attached to the vehicle 112 under essentially the same concept. For simplicity, the following description will be made with reference to the power electronics controller 200 of the vehicle 112. At operation 302, the power electronics controller 200 detects whether a resolver offset testing condition is met. The resolver offset condition may include various situations. For instance, the power electronics controller 200 may be configured to perform the resolver offset measurement process 300 each time the vehicle is keyed-off, and/or put in park. Alternatively, the process 300 may be also performed on a spinning electric machine 114. Responsive to detecting the measurement condition is met, the process proceeds to operation 304 and the power electronics controller 200 injects a current only having a d-axis component based on the current rotor position measured by the feedback device 202. The power electronics controller 200 further measures a speed and/or torque output (motion output) from the electric machine 114. If the resultant speed/torque output from the electric machine in response to the d-axis current injection is below a predefined threshold indicating the resolver offset error is within a tolerable amount, the process returns to operation 302. Otherwise, if the speed/torque output is above the threshold, the process proceeds to operation 308 and the power electronics controller 200 adjusts the resolver offset using the speed/torque output as measured and the magnitude of injection current. There are a few ways to adjust the resolver offset based on the output from the electric machine 114. As an example, a look-up table (not shown) indicative of a corresponding relationship between the injection current magnitude, the output recorded, and the count adjustment for the resolver offset may be provided to the power electronics controller 200. Alternatively, the power electronics controller 200 may use a predefined algorithm to determine the adjustment amount using magnitude of the injection current and the output data from the electric machine 114 as input presented in the following equation as an example:

Adjust_count=$f$(Id_magnitude,Motor_output)

At operation 310, the power electronics controller 200 re-injects the d-axis-only current based on the resolver offset as adjusted and measures the speed/torque output. Here, since the vehicle is still off or parked, the motor position should still be the same. If the latest measured speed/torque output reduces to within the threshold indicative of the adjusted resolver offset having a tolerable amount of error, the process proceeds to operation 314 and the power electronics controller 200 records the current resolver offset as adjusted. Otherwise, if the speed/torque output is still beyond the threshold, the process proceeds to operation 316 to verify if the newly measured speed/torque output is less or greater than the previously measured speed/torque output. If the magnitude of the newly measured output is less than the magnitude of the previously measured output, indicative of an accuracy improvement of the resolver offset after the adjustment, the process returns to operation 308 to repeat the adjustment process until the output from the electric machine 114 is within the threshold. Here, the power electronics controller 200 may be further configured to adjust the magnitude of the d-axis injection current at operation 318, For instance, the power electronics controller 200 may increase the magnitude of the injection current to compensate for the reduced output magnitude such that the next speed/torque output may be more observable. To compensate for the increased d-axis current magnitude, the power electronics controller 200 may be further configured to adjust (e.g., increase) the threshold used at operation 312 accordingly. The power electronics controller 200 may be further configured to normalize the value of the resultant speed/torque outputs from the electric machine before the comparison at operation 316. Otherwise, if the newly measured output is greater than the previously measured output, resolver offset as adjusted is less accurate than the pre-adjusted status, the process proceeds to operation 320 and the power electronics controller 200 flags an error and outputs the error to a vehicle user. For instance, a message may be output to the vehicle user via a human-machine interface to ask the user to schedule a repair.

Figure 4:
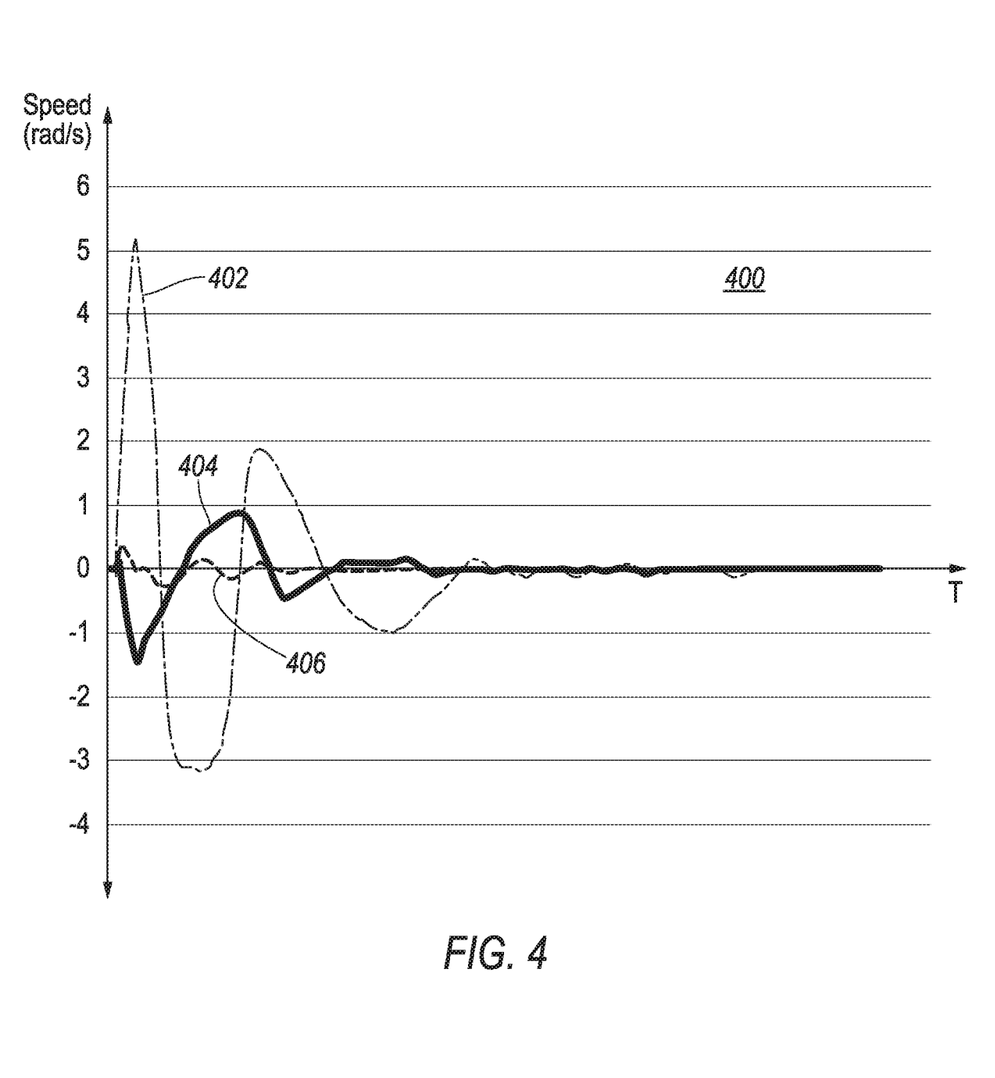
FIG. 4 depicts a waveform diagram of an electric machine speed output in response to a d-axis current injection.

The operations of the process 300 may be applied to various situations. Referring to FIG. 4, an example waveform diagram of an electric machine speed output in response to a d-axis current injection is illustrated. Responsive to detecting a resolver offset measurement condition being met, the power electronics controller 200 may inject a d-axis current having a magnitude of 250 A into the electric machine 114. In the present example, the d-axis current is injected momentarily (i.e., a pulse current). A waveform 402 represents a resultant motor speed output in response to the 250 A d-axis current. As illustrated in FIG. 4, the power electronics controller 200 may record a resultant motor speed output having a peak value of more than +5 rad/s in a forward direction which is above a predefined threshold (e.g., +/−1 rad/s). The power electronics controller 200 may determine an adjustment amount using the magnitude of the motor speed output. In the present example, the +5 rad/s speed responsive to 250 A current injection may correspond to 40 counts resolver offset adjustment in the positive direction (e.g., 496 counts per revolution). Having the adjustment amount and direction determined, the power electronics controller 200 may apply the adjustment and re-inject the d-axis current pulse accordingly. As illustrated by waveform 404, the resultant motor speed output after the adjustment has a significantly less magnitude of −1.2 rad/s in the reverse direction, which is still beyond the threshold. The power electronics controller 200 may continue to adjust the resolver offset by 7 counts in the negative direction and perform the current injection again until the resultant speed output is within the threshold as represented by a waveform 406 having a maximum magnitude of +0.5 rad/s in the forward direction.

Figure 5A:
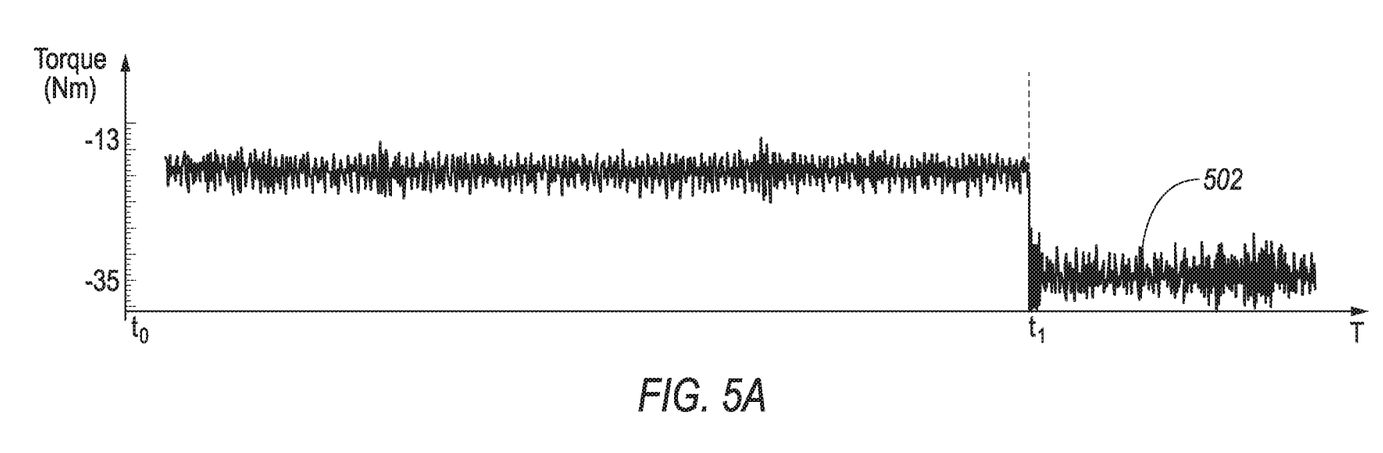
FIGS. 5A and 5B depict a waveform diagram of an electric machine torque output in response to a d-axis current injection.
Figure 5B:
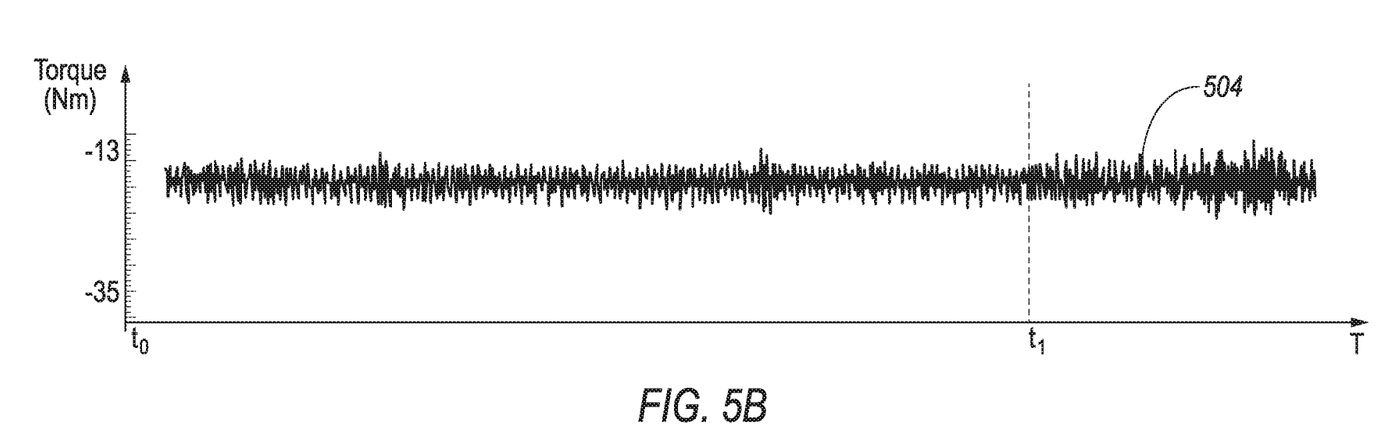

Referring to FIGS. 5A and 5B, waveform diagrams of electric machine torque output in response to a d-axis current injection are illustrated. In the present example, a persistent 100 A d-axis current is injected into a spinning electric machine 114 and the resultant torque output responsive to the current injection may be measured by the power electronics controller 200. It is noted that although the present example is described with reference to a rotating electric machine, the same concept may also be applied to a stationary electric machine. As illustrated with reference to FIG. 5A, no current injection is performed between to until $t_1$ when the 100 A d-axis current is injected into the electric machine 114. Before the current injection, a motor drag torque of approximately −13 Nm may be recorded by the power electronics controller 200. After the current injection, the torque output of the electric machine 114 drops to −35 Nm and is recorded. In other words, the power electronics controller 200 measured a −22 Nm torque as a result of the 100 A d-axis current injection, beyond the torque threshold (e.g., +/−5 Nm). The power electronics controller 200 may adjust the resolver offset by 29 counts in the negative direction corresponding to the 100 A d-axis current injection and −22 Nm torque output, and then reperform the measurement. As illustrated by a waveform 504 in FIG. 5B, the torque output remains essentially unchanged at around −13 Nm after the torque injection at $t_1$ as a result of the resolver offset adjustment.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to strength, durability, life cycle, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
an electric machine having a rotor and a stator;
a resolver configured to measure a position of the rotor relative to the stator; and
a controller programmed to,
based on the position and a resolver offset, inject a first current having only a d-axis component into the electric machine, and
responsive to detecting a first motion output of the electric machine being greater than a threshold, adjust the resolver offset according to a magnitude and direction of the first motion output, wherein the first motion output includes at least one of a speed output or a torque output.

2. The vehicle of claim 1, wherein the controller is further programmed to, based on the position and the resolver offset as adjusted, inject a second current having only a d-axis component into the electric machine.

3. The vehicle of claim 2, wherein the controller is further programmed to, responsive to detecting a second motion output of the electric machine being greater than the threshold, further adjust the resolver offset according to a magnitude and direction of the second motion output.

4. The vehicle of claim 3, wherein the controller is further programmed to responsive to the magnitude of the second motion output being less than the magnitude of the first motion output, inject a third current having an increased magnitude from the second current into the electric machine.

5. The vehicle of claim 2, wherein the controller is further programmed to normalize a plurality of motion outputs of the electric machine.

6. The vehicle of claim 1, wherein the controller is further programmed to adjust the resolver offset according to a magnitude of the first current.

7. The vehicle of claim 1, wherein the controller is further programmed to adjust the resolver offset according to a magnitude of the first current based on a lookup table.

8. A method for controlling an electric machine of a vehicle comprising:
while the vehicle is parked, repeatedly injecting current into the electric machine having only a d-axis component until motion output of a rotor of the electric machine corresponding to the current is less than a threshold.

9. The method of claim 8, wherein the motion output is speed output or torque output.

10. The method of claim 8 further comprising updating a resolver offset based on the motion output.

11. A device for measuring a resolver offset of a resolver of an electric machine of a vehicle, the device comprising:
a controller programmed to, responsive to a resolver offset testing condition being met, command that a first current having only a d-axis component be injected into the electric machine, and responsive to detecting a first motion output of the electric machine being greater than a threshold, adjust the resolver offset according to a magnitude and direction of the first motion output.

12. The device of claim 11, wherein the controller is further programmed to, based on resolver offset as adjusted, inject a second current having only a d-axis component into the electric machine.

13. The device of claim 12, wherein the controller is further programmed to, responsive to detecting a second motion output of the electric machine being greater than the threshold, further adjust the resolver offset according to a magnitude and direction of the second motion output.

14. The device of claim 13, wherein the controller is further programmed to responsive to the magnitude of the second motion output being less than the magnitude of the first motion output, inject a third current having an increased magnitude from the second current into the electric machine.

15. The device of claim 12, wherein the controller is further programmed to normalize a plurality of motion outputs of the electric machine.

16. The device of claim 11, wherein the first motion output includes at least one of a speed output or a torque output.

17. The device of claim 11, wherein the controller is further programmed to adjust the resolver offset according to a magnitude of the first current.

18. The device of claim 11, wherein the controller is further programmed to adjust the resolver offset according to a magnitude of the first current based on a lookup table.

\* \* \* \* \*